Nov. 2, 1965     I. L. NELSON ETAL     3,215,458
COUPLING
Filed Oct. 31, 1962
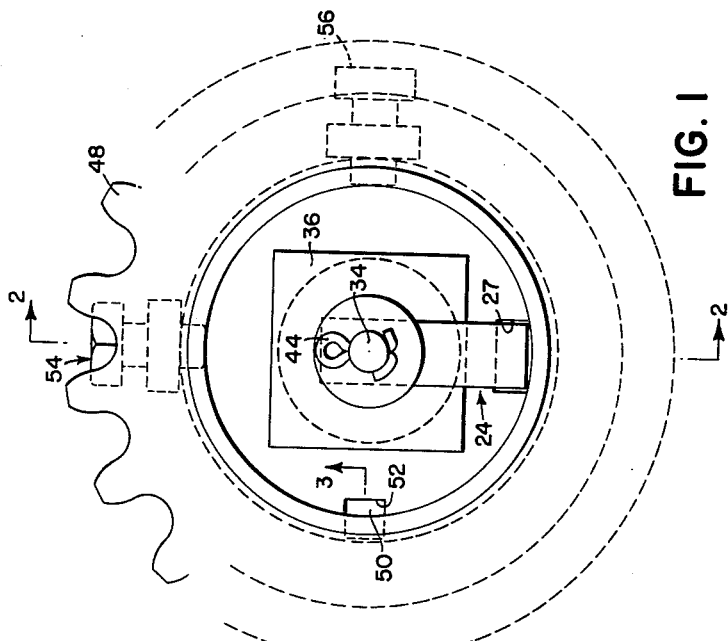
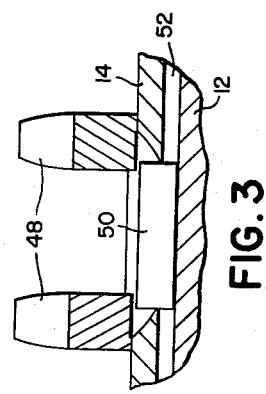
FIG. 1
FIG. 3
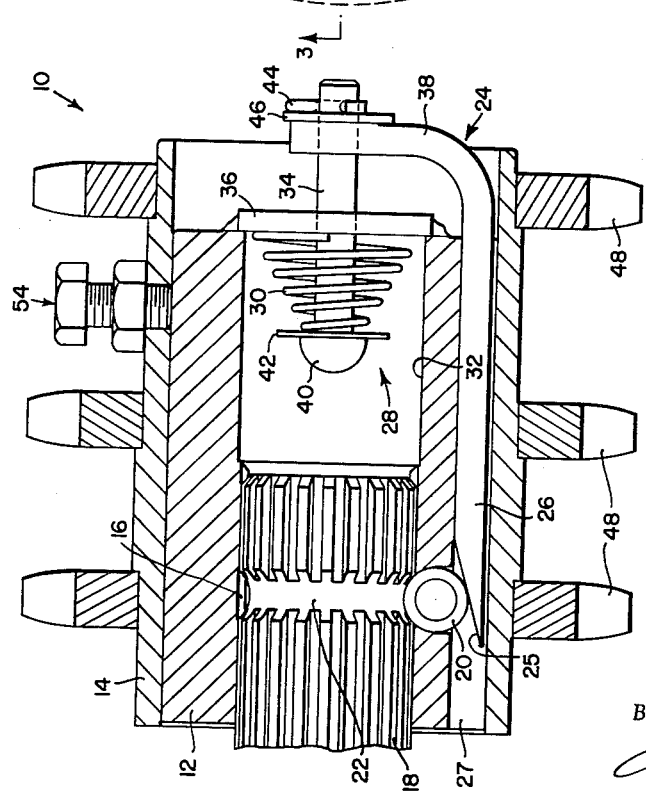
FIG. 2
INVENTORS.
IVAN L. NELSON
NEAL C. CHAMBERLAIN
BY
ATTORNEY United States Patent Office 3,215,458
Patented Nov. 2, 1965

3,215,458
COUPLING
Ivan L. Nelson and Neal C. Chamberlain, Madrid, Iowa, assignors to Deere & Company, Moline, Ill., a corporation of Delaware
Filed Oct. 31, 1962, Ser. No. 234,310
7 Claims. (Cl. 287—53)

The present invention relates generally to a coupling mechanism and more particularly to a coupling mechanism adapted to drive an implement from a tractor power take-off shaft by means of sprockets and/or sheaves.

Up to the present time there has been no satisfactory arrangement devised for mounting sprockets and/or sheaves on the 1000 r.p.m. power take-off shaft of a tractor. On the 540 r.p.m. power take-off shaft of tractors, which has relatively recently been supplemented by the 1000 r.p.m. power take-off, three or more inches of a 6-tooth spline shaft are exposed and it has been possible to employ a split hub and bolt it to the shaft. On the 1000 r.p.m. power take-off shaft, which consists of a 21-tooth spline shaft of which only two inches are available for clamping, the bolted type of split hub has not proved satisfactory. Furthermore, the two inches of exposition leaves little or no room for moving the sprockets and/or sheaves on the shaft for alinement purposes.

Therefore, the object and general nature of the present invention is to provide a novel assembly which overcomes the disadvantages of the prior art construction. More specifically, it is an object of the present invention to provide an assembly that is easily attached and removed from a power take-off shaft. Another object of the present invention is to provide an assembly that is easily adjusted for alinement purposes. Another object of the present invention is to provide a coupling having a spring biased locking means in which the spring is completely enclosed and protected from weather, dirt, weed, and crop damage.

These and other objects and advantages of the present invention will be apparent to those skilled in the art after a consideration of the following detailed description, taken in conjunction with the accompanying drawings in which:

FIG. 1 is an end view of a drive sprocket and hub employing the principles of the present invention.

FIG. 2 is a sectional view taken along the line 2—2 of FIG. 1, and

FIG. 3 is a sectional view taken along the line 3—3 of FIG. 1.

Referring first to FIG. 2, applicants' novel assembly, indicated generally at 10, includes an inner or first sleeve 12 and an outer or second sleeve 14, the inner sleeve 12 being provided with an internally splined first portion 16 which is adapted to be connected with a tractor power take-off shaft 18 for rotation therewith. The inner sleeve 12 is secured against axial movement with respect to the power take-off shaft 18 by means of a roller 20 which is forced into engagement with the groove 22 on the shaft 18 by means of the wedge member 24 which is provided with a cam surface 25. One portion 26 of the wedge member 24 is slidably disposed within the slot 27 of the sleeve 12 and is normally held inwardly in the position shown in FIG. 2 by the spring assembly 28. The spring assembly includes a spiral spring 30 disposed within an unsplined second portion 32 of the sleeve 12. The spring is disposed about a pin 34 which extends rearwardly through an aperture in the stop member 36 and through a hole in the bent portion 38 of the wedge 24. The front end of the pin 34 is provided with a head 40, and disposed between one end of the spring 30 and the head 40 is a washer 42. The spring is normally held under compression between the washer 42 and the stop 36 which is secured, as by welding, to one end of the sleeve 12. The rear end of the pin is apertured and receives a cotter pin 44 which bears against a second washer 46.

The outer sleeve 14, which in this instance carries drive sprockets 48, is provided with a key 50 which is adapted to rest in keyway 52 of the inner sleeve 12. The first time an implement is mounted on the tractor, the sleeve 14 is longitudinally adjusted in such a manner that the drive sprockets 48 are correctly lined up with the driven sprockets on the implement and the sleeve is then fixed in its alined position by means of fasteners 54, 56 carried by the outer sleeve and adapted to bear against the outer surface of the inner sleeve 12.

To install the assembly on the power take-off shaft, it is merely necessary to hold the wedge member 24 to the rear against the action of the spring 30 and push the sleeve 12 forwardly over the end of the power take-off shaft, and after the splines have become engaged, the pull on the wedge member 24 may be released, then the assembly need merely be pushed further on until the roller 20 rests in the groove 22 on the power take-off shaft 18. To remove the assembly again it is merely necessary to pull the wedge member 24 rearwardly sufficiently to permit the roller to roll out of the groove as the assembly is withdrawn.

While we have shown and described above the preferred structure in which the principles of the present invention have been incorporated, it is to be understood that our invention is not to be limited to the particular means shown and described above, but that, in fact, widely different means may be employed in the practice of the broader aspects of this invention.

What we claim therefore, and desire to secure by Letters Patent is:

1. A coupling for connecting a splined power take-off shaft with an implement, said coupling comprising a sleeve having first and second coaxial portions, said first portion being provided with an internally splined surface adapted to be slidably nonrotatably disposed about a power take-off shaft for rotation therewith, a spring assembly comprising a compression spring disposed within the second portion of the sleeve, a pin having a portion disposed within said spring and carrying a first surface abuttingly engaged by said spring, and an apertured stop member secured to an end portion of said sleeve and serving to enclose the spring within said second portion, the other end of said compression spring abutting said apertured stop member, said pin passing through said aperture and extending beyond said stop member, a second abutting surface on said pin and disposed beyond said apertured stop, a wedge member having a first portion disposed between said stop member and said second abutting surface and engageable by said second abutting surface, said wedge member having a second portion disposed substantially axially along said sleeve, said second portion of the wedge being provided with a cam surface at one end thereof, a roller disposed within an apertured portion of the side wall of said sleeve and adapted to be engaged by said cam surface and to be forced into engagement with a groove on said power take-off shaft to prevent relative axial sliding movement of said sleeve about the power take-off shaft, and means mounted on said sleeve and adapted to be interconnected with the implement.

2. A coupling for connecting a power take-off shaft with an implement comprising a first sleeve, means carried by said first sleeve to secure said sleeve to a power take-off shaft to prevent relative rotational and axial movement of the first sleeve with respect to said shaft, a second sleeve slidably and nonrotatably disposed about said first sleeve, means to adjustably fix said second sleeve to said first sleeve to prevent relative axial movement of the second sleeve with respect to said first sleeve, and drive means mounted on said second sleeve and adapted to be interconnected with the implement.

3. A coupling for connecting a power take-off shaft with an implement comprising a first sleeve, means carried by said first sleve to secure said first sleeve to a power take-off shaft to prevent relative rotational and axial movement of the first sleeve with respect to said shaft, a second sleeve disposed about said first sleeve, means keying said second sleeve to said first sleeve to prevent rotation of one sleeve with respect to the other, fastener means carried by said second sleeve and adapted to prevent sliding of said second sleeve with respect to said first sleeve whereby said second sleeve can be held in an axially predetermined condition with respect to said first sleeve, and drive means mounted on said second sleeve and adapted to be interconnected with the implement.

4. A coupling for connecting a power take-off shaft with an implement, said coupling comprising a first sleeve having a first internal portion adapted to be connected with a power take-off shaft for rotation therewith, spring means enclosed within a second internal portion of the first sleeve, locking means cooperable with the spring to prevent relative axial movement of said first sleeve about the power take-off shaft, a second sleeve slidably and nonrotatably disposed about said first sleeve, means to adjustably fix said second sleeve about said first sleeve to prevent relative axial movement of the second sleeve with respect to said first sleeve, and drive means mounted on said second sleeve and adapted to be interconnected with the implement.

5. A coupling for connecting a power take-off shaft with an implement, said coupling comprising a first sleeve having a first internal portion adapted to be connected with a power take-off shaft for rotation therewith, a spring assembly comprising a spring disposed within a second portion of the sleeve, a pin having a portion disposed within said spring and carrying a surface adapted to be abuttingly engaged by said spring, and an apertured stop member secured to said sleeve and serving to enclose the spring within said second portion, said pin passing through said aperture and extending beyond said stop member, locking means cooperable with said pin to prevent relative axial movement of said first sleeve about the power take-off shaft, a second sleeve slidably and nonrotatably disposed about said first sleeve, means to adjustably fix said second sleeve to said first sleeve to prevent relative axial movement of the second sleeve with respect to said first sleeve, and drive means mounted on said second sleeve and adapted to be interconnected with the implement.

6. A coupling for connecting a power take-off shaft with an implement, said coupling comprising a first sleeve having a first internal portion adapted to be connected with a power take-off shaft for rotation therewith, a spring assembly comprising a compression spring disposed within a second portion of the first sleeve, a pin having a portion disposed within said spring and carrying a first surface adapted to be abuttingly engaged by said spring, and an apertured stop member secured to an end portion of said first sleeve and serving to enclose the spring within said second portion, said pin passing through said aperture and extending beyond said stop member, a second abutting surface on said pin and disposed beyond said apertured stop, a wedge member having a first portion disposed between said stop and said second abutting surface and engageable by said second abutting surface, said wedge member having a second portion disposed along said first sleeve, said second portion of the wedge being provided with a cam surface at one end thereof, a roller disposed within an apertured portion of the side wall of said first sleeve and adapted to be engaged by said cam surface and to be forced into engagement with a groove on said power take-off shaft to prevent relative axial movement of said sleeve about the power take-off shaft, a second sleeve slidably disposed about said first sleeve, means keying said second sleeve to said first sleeve to prevent rotation of one sleeve with respect to the other, fastener means carried by said second sleeve and adapted to prevent sliding of said second sleeve with respect to said first sleeve whereby said second sleeve can be held in an axially predetermined condition with respect to said first sleeve, and drive means mounted on said second sleeve and adapted to be interconnected with the implement.

7. A coupling for connecting a splined power take-off shaft having a circumferential groove spaced from the end of the shaft with an implement, said coupling comprising a sleeve having first and second coaxial parts, said first part being provided with an internally splined surface adapted to be slidably nonrotatably disposed about said power take-off shaft for rotation therewith, a spring assembly comprising a spring disposed generally coaxially within the second coaxial part, a pin having a portion disposed within said coil spring and carrying a surface abuttingly engaged by one end of said spring, and an apertured stop member secured to said sleeve and serving to enclose the spring within said second coaxial part, the other end of said coil spring abutting said apertured stop plate, said pin passing through said aperture and extending beyond said stop member, locking means operatively interconnected with said sleeve and including a first portion located adjacent the sleeve and engaged and normally biased by said spring assembly, a second portion extending substantially axially of the sleeve, and a third portion carried by the sleeve comprising a key engaged and biased radially inwardly by the second portion, said key being adapted to engage the circumferential groove to prevent axial sliding movement of the sleeve about the power take-off shaft when said first coaxial part is disposed about said power take-off shaft, and means mounted on said sleeve and adapted to be interconnected with the implement.

References Cited by the Examiner

UNITED STATES PATENTS

| | | | |
|---|---|---|---|
| 1,723,824 | 8/29 | Toebler | 279—30 |
| 1,969,426 | 8/34 | Ross | 279—79 |
| 2,009,371 | 7/35 | Junge. | |
| 2,396,545 | 3/46 | Wienke. | |
| 2,448,278 | 8/48 | Ronning | 287—52 |
| 2,601,389 | 6/52 | Guelph | 286—53 |
| 2,630,872 | 3/53 | Roos et al. | 180—53 |
| 2,885,232 | 5/59 | Eberly | 287—53 |
| 3,015,867 | 1/62 | Bronstein et al. | 24—211 |

FOREIGN PATENTS 888,359    8/53    Germany.

CARL W. TOMLIN, *Primary Examiner.*